(12) United States Patent
Jeon

(10) Patent No.: US 11,741,039 B2
(45) Date of Patent: Aug. 29, 2023

(54) PERIPHERAL COMPONENT INTERCONNECT EXPRESS DEVICE AND METHOD OF OPERATING THE SAME

(71) Applicant: SK hynix Inc., Icheon (KR)

(72) Inventor: Yong Tae Jeon, Icheon (KR)

(73) Assignee: SK hynix Inc., Icheon (KR)

( * ) Notice: Subject to any disclaimer, the term of this patent is extended or adjusted under 35 U.S.C. 154(b) by 8 days.

(21) Appl. No.: 17/467,078

(22) Filed: Sep. 3, 2021

(65) Prior Publication Data
US 2022/0300448 A1     Sep. 22, 2022

(30) Foreign Application Priority Data
Mar. 18, 2021 (KR) .................. 10-2021-0035522

(51) Int. Cl.
*G06F 13/36* (2006.01)
*G06F 13/42* (2006.01)

(52) U.S. Cl.
CPC .. *G06F 13/4221* (2013.01); *G06F 2213/0026* (2013.01)

(58) Field of Classification Search
CPC ......... G06F 13/4221; G06F 2213/0026; G06F 9/5077; G06F 9/5027; G06F 13/1642; G06F 13/28
See application file for complete search history.

(56) References Cited

U.S. PATENT DOCUMENTS

| | | |
|---|---|---|
| 7,852,757 B1 | 12/2010 | Puranik |
| 8,199,759 B2 | 6/2012 | Singhal et al. |
| 9,996,484 B1 | 6/2018 | Davis et al. |
| 10,176,126 B1 | 1/2019 | Banerjee et al. |

(Continued)

FOREIGN PATENT DOCUMENTS

| | | |
|---|---|---|
| JP | 2007065847 A | 3/2007 |
| JP | 2015-503154 A | 1/2015 |

(Continued)

OTHER PUBLICATIONS

Office Action dated Jun. 27, 2022 for U.S. Appl. No. 17/467,070.
(Continued)

*Primary Examiner* — Henry Tsai
*Assistant Examiner* — Kim T Huynh

(57) ABSTRACT

A PCIe device and a method of operating the same are provided. The PCIe device may include a throughput calculator configured to calculate a throughput of each of a plurality of functions, a throughput analysis information generator configured to generate throughput analysis information indicating a result of a comparison between a throughput limit and the calculated throughput, a delay time information generator configured to generate a delay time for delaying a command fetch operation for each function based on the throughput analysis information, a command lookup table storage configured to store command-related information and a delay time of a function corresponding to a target command, the command-related information including information related to the target command to be fetched from a host, and a command fetcher configured to fetch the target command based on the command-related information and the delay time of the corresponding function.

20 Claims, 8 Drawing Sheets

(56) References Cited

U.S. PATENT DOCUMENTS

| | | |
|---|---|---|
| 2006/0168384 A1 | 7/2006 | Radhakrishnan et al. |
| 2006/0242332 A1 | 10/2006 | Johnsen et al. |
| 2006/0259656 A1 | 11/2006 | Sullivan |
| 2007/0220193 A1 | 9/2007 | Ikeda et al. |
| 2008/0301605 A1 | 12/2008 | Ando et al. |
| 2009/0049256 A1 | 2/2009 | Hughes et al. |
| 2009/0103434 A1 | 4/2009 | Madsen et al. |
| 2010/0250785 A1 | 9/2010 | Shin et al. |
| 2011/0134915 A1* | 6/2011 | Srinivasan .............. G06F 13/28 370/389 |
| 2011/0289242 A1 | 11/2011 | Srinivasan et al. |
| 2012/0005300 A1 | 1/2012 | Muppalla |
| 2012/0072679 A1 | 3/2012 | Biswas et al. |
| 2014/0237156 A1 | 8/2014 | Regula et al. |
| 2014/0281053 A1* | 9/2014 | Suzuki ................... G06F 13/28 710/22 |
| 2014/0281099 A1 | 9/2014 | Avez et al. |
| 2016/0162436 A1* | 6/2016 | Raghavan ............... G06F 13/28 710/308 |
| 2017/0123730 A1 | 5/2017 | Losh |
| 2018/0293101 A1 | 10/2018 | Park et al. |
| 2019/0058675 A1 | 2/2019 | Schubert et al. |
| 2019/0113957 A1* | 4/2019 | Chiu ................... G06F 13/4295 |
| 2019/0146684 A1 | 5/2019 | Benisty et al. |
| 2019/0179784 A1* | 6/2019 | Tsuji ....................... G06F 13/36 |
| 2020/0065028 A1 | 2/2020 | Keil et al. |
| 2020/0293499 A1* | 9/2020 | Kohli ................... G06F 3/0604 |
| 2021/0224210 A1 | 7/2021 | Ouyang et al. |
| 2022/0124051 A1 | 4/2022 | Brewer et al. |

FOREIGN PATENT DOCUMENTS

| | | |
|---|---|---|
| JP | 2019505924 A | 2/2019 |
| KR | 10-2004-0029010 A | 4/2004 |
| KR | 10-2016-0075312 A | 6/2012 |
| KR | 10-1414079 B1 | 7/2014 |
| KR | 10-2016-0016557 A | 2/2016 |
| KR | 10-2018-0019567 A | 2/2018 |
| KR | 1020190032716 A | 3/2019 |
| KR | 10-2020-0016810 A | 2/2020 |
| KR | 1020200073592 A | 6/2020 |
| KR | 102238652 B1 | 4/2021 |

OTHER PUBLICATIONS

Office Action dated Sep. 6, 2022 for U.S. Appl. No. 17/467,054.
Office Action dated Nov. 9, 2022 for U.S. Appl. No. 17/467,070.
Office Action dated Feb. 21, 2023 for U.S. Appl. No. 17/467,054.
Office Action dated Mar. 27, 2023 for U.S. Appl. No. 17/467,070.

* cited by examiner

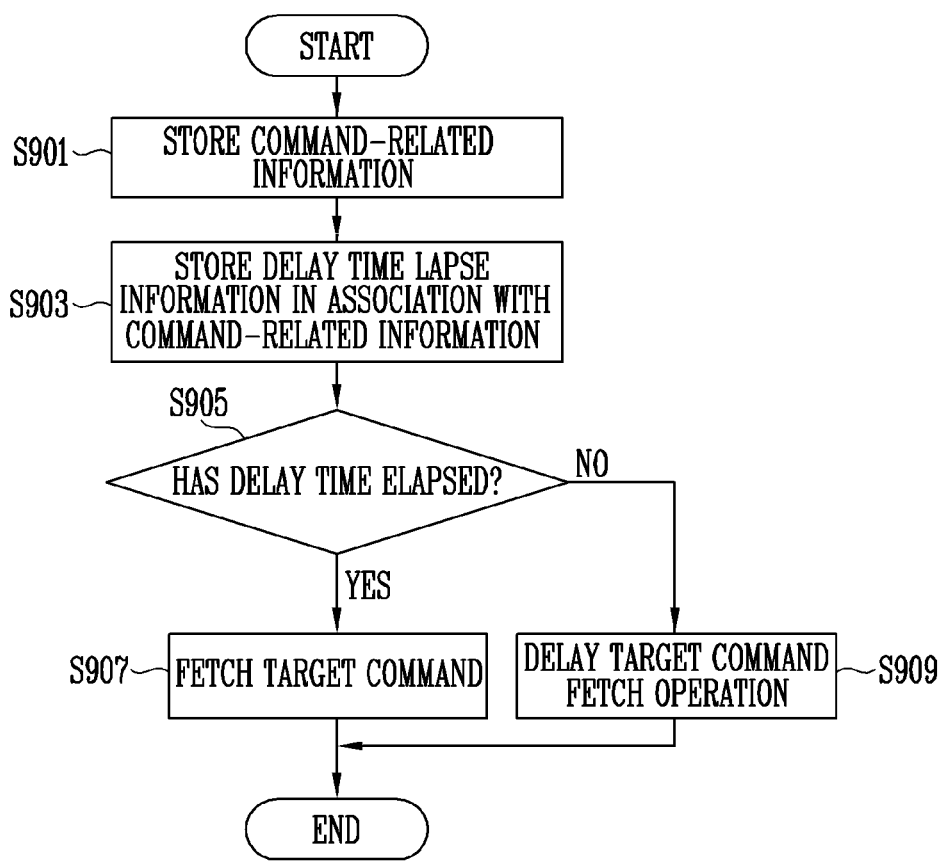

PERIPHERAL COMPONENT INTERCONNECT EXPRESS DEVICE AND METHOD OF OPERATING THE SAME

CROSS-REFERENCE TO RELATED APPLICATION

The present application claims priority under 35 U.S.C. § 119(a) to Korean patent application number 10-2021-0035522 filed on Mar. 18, 2021, in the Korean Intellectual Property Office, the entire disclosure of which is incorporated by reference herein.

BACKGROUND

1. Technical Field

Various embodiments of the present disclosure generally relate to an electronic device, and more particularly to a Peripheral Component Interconnect Express (PCIe) device and a method of operating the PCIe device.

2. Related Art

Peripheral Component Interconnect (PCI) defines a bus protocol used to couple input/output devices to a host device. PCI Express (PCIe) has the concept of programming defined in a PCI standard and defines a physical communication layer as a high-speed serial interface.

A storage device is a device which stores data under the control of a host device such as a computer or a smartphone. The storage device may include a memory device in which data is stored and a memory controller which controls the memory device. Memory devices may be classified into a volatile memory device and a nonvolatile memory device.

The volatile memory device may be a memory device in which data is stored only when power is supplied and in which stored data is lost when the supply of power is interrupted. Examples of the volatile memory device may include a static random access memory (SRAM) and a dynamic random access memory (DRAM).

The nonvolatile memory device may be a memory device in which stored data is retained even when the supply of power is interrupted. Examples of the nonvolatile memory device may include a read only memory (ROM), a programmable ROM (PROM), an electrically programmable ROM (EPROM), an electrically erasable and programmable ROM (EEPROM), and a flash memory.

SUMMARY

Various embodiments of the present disclosure are directed to a PCIe device capable of limiting performance for each function and a method of operating the PCIe device.

An embodiment of the present disclosure may provide for a Peripheral Component Interconnect Express (PCIe) device. The PCIe device may include a throughput calculator configured to calculate a throughput of each of a plurality of functions, a throughput analysis information generator configured to generate, for each of the plurality of functions, throughput analysis information indicating a result of a comparison between a throughput limit that is set for each of the plurality of functions and the calculated throughput, a delay time information generator configured to generate a delay time for delaying a command fetch operation for each of the plurality of functions based on the throughput analysis information, a command lookup table storage configured to store command-related information and a delay time of a function corresponding to a target command, the command-related information including information related to the target command to be fetched from a host, and a command fetcher configured to fetch the target command from the host based on the command-related information and the delay time of the corresponding function.

An embodiment of the present disclosure may provide for a method of operating a Peripheral Component Interconnect Express (PCIe) device. The method may include calculating a throughput of each of a plurality of functions, generating, for each of the plurality of functions, throughput analysis information indicating a result of a comparison between a throughput limit that is set for each of the plurality of functions and the calculated throughput, generating a delay time for delaying a command fetch operation for each of the plurality of functions based on the throughput analysis information, acquiring command-related information including information related to a target command to be fetched from a host, and fetching the target command from the host based on the command-related information and a delay time of a function corresponding to the target command, among the plurality of functions.

BRIEF DESCRIPTION OF THE DRAWINGS

FIG. 9 is a flowchart illustrating a method of fetching a target command according to an embodiment of the present disclosure.

DETAILED DESCRIPTION

Specific structural or functional descriptions in the embodiments of the present disclosure introduced in this specification or application are exemplified to describe embodiments according to the concept of the present disclosure. The embodiments according to the concept of the present disclosure may be practiced in various forms, and should not be construed as being limited to the embodiments described in the specification or application.

Figure 1:
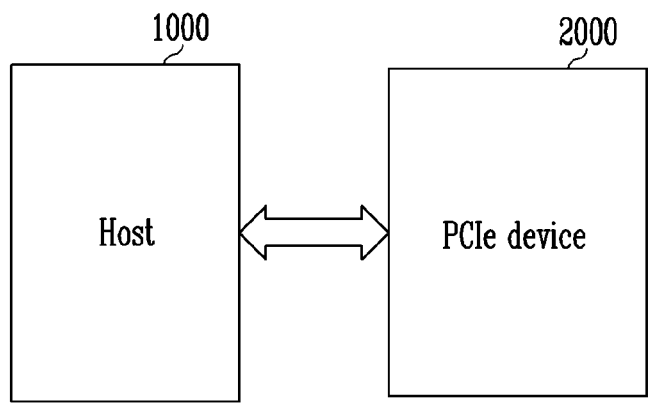
FIG. 1 illustrates a computing system according to an embodiment of the present disclosure.

FIG. 1 illustrates a computing system 100 according to an embodiment of the present disclosure.

Referring to FIG. 1, the computing system 100 may include a host 1000 and a Peripheral Component Interconnect Express (PCIe) device 2000. For example, the computing system 100 may be a mobile phone, a smartphone, an MP3 player, a laptop computer, a desktop computer, a game console, a TV, a tablet PC, an in-vehicle infotainment system, or the like.

The host 1000 may control processing of data and operations of the computing system 100. The host 1000 may store data, commands, and/or program codes required for the operations of the computing system 100.

The host 1000 may include an input/output control module which couples input/output devices to each other. For example, the input/output control module may include one or more of a Universal Serial Bus (USB) adapter, a Peripheral Component Interconnect (PCI) or PCI Express (PCIe) adapter, a Small Computer System Interface (SCSI) adapter, a Serial AT Attachment (SATA) adapter, a NonVolatile Memory express (NVMe) adapter, etc. The host 1000 may communicate information with devices coupled to the computing system 100 through the input/output control module.

PCI defines a bus protocol used to couple the input/output devices to each other. PCIe has the concept of programming defined in a PCI standard and defines a physical communication layer as a high-speed serial interface.

The PCIe device 2000 may communicate with the host 1000 using PCIe. For example, the PCIe device 2000 may be implemented in various I/O device types, such as a network and a storage.

In an embodiment, the PCIe device 2000 may be defined as an endpoint or a device including the endpoint.

The endpoint denotes a type of a function that can be a requester or completer of a PCIe transaction. The endpoint may be classified as a legacy endpoint, a PCIe endpoint, or a Root Complex Integrated Endpoint (RCiEP).

The legacy endpoint may be a function having a type 00h configuration space header. The legacy endpoint may support a configuration request as a completer. The legacy endpoint may support an input/output (I/O) request as a completer. The legacy endpoint may accept I/O requests for either or both of 80h and 84h locations regardless of an I/O decoding configuration of the corresponding endpoint. The legacy endpoint may generate I/O requests. The legacy endpoint should not issue a locked request. The legacy endpoint may implement extended configuration space capabilities.

A legacy endpoint, functioning as a requester of a memory transaction, is not required to generate addresses above (or equal to) 4 GB. When an interrupt resource is requested, the legacy endpoint is required in order to support either or both of Message Signaled Interrupt (MSI) and MSI-X. When the message signaled interrupt (MSI) is implemented, the legacy endpoint may support a 32-bit or 64-bit message address version of an MSI function structure. The legacy endpoint may support 32-bit address allocation for a base address register which requests memory resources. The legacy endpoint may appear in any one of hierarchy domains originated by a root complex.

The PCIe endpoint may be a function having a type 00h configuration space header. The PCIe endpoint may support a configuration request as a completer. The PCIe endpoint should not depend on the operating system (OS) allocation of I/O resources, which is requested through a base address register (BAR). The PCIe endpoint cannot generate an I/O request. The PCIe endpoint can neither support a locked request as a completer nor generate a locked request as a requester. A PCIe-compatible software driver and application may be created not to use lock semantics when accessing the PCIe endpoint.

A PCIe endpoint, functioning as a requester of a memory transaction, may generate addresses above 4 GB. When an interrupt resource is requested, the PCIe endpoint may be required in order to support either or both of MSI and MSI-X. When the MSI is implemented, the PCIe endpoint may support a 64-bit message address version of an MSI function structure. A minimum memory address range requested by the base address register may be 128 bytes. The PCIe endpoint may appear in any one of hierarchy domains originated by a root complex.

The Root Complex Integrated Endpoint (RCiEP) may be implemented in internal logic of a root complex including a root port. The RCiEP may be a function having a type 00h configuration space header. The RCiEP may support a configuration request as a completer. The RCiEP may not require I/O resources requested through a base address register. The RCiEP may not generate I/O requests. The RCiEP can neither support a locked request as a completer nor generate a locked request as a requester. A PCIe-compatible software driver and application may be created not to use lock semantics when accessing the RCiEP. The RCiEP, functioning as a requester of a memory transaction, may generate addresses having capacity equal to or greater than that of addresses that can be processed by the host 1000 that is a completer.

When an interrupt resource is requested, the RCiEP is required in order to support either or both of MSI and MSI-X. When the MSI is implemented, the RCiEP is allowed to support a 32-bit or 64-bit message address version of an MSI function structure. The RCiEP may support 32-bit address allocation for a base address register which requests memory resources. The RCiEP cannot implement link capabilities, link status, link control, link capabilities 2, link status 2, and link control 2 registers in PCI express extended capability. The RCiEP may not implement active status power management. The RCiEP may not be entirely and independently hot-plugged with a root complex. The RCiEP may not appear in hierarchy domains exposed by the root complex. The RCiEP may not appear in switches.

In an embodiment, the PCIe device 2000 may generate one or more virtual devices. For example, the PCIe device 2000 may store program codes for generating one or more virtual devices.

In an embodiment, the PCIe device 2000 may generate a physical function (PF) device or a virtual function (VF) device based on a virtualization request received from the host 1000. For example, the physical function device may be set to a virtual device that can be accessed by a virtualization intermediary of the host 1000. The virtual function device may be set to a virtual device allocated to a virtual machine of the host 1000.

Figure 2:
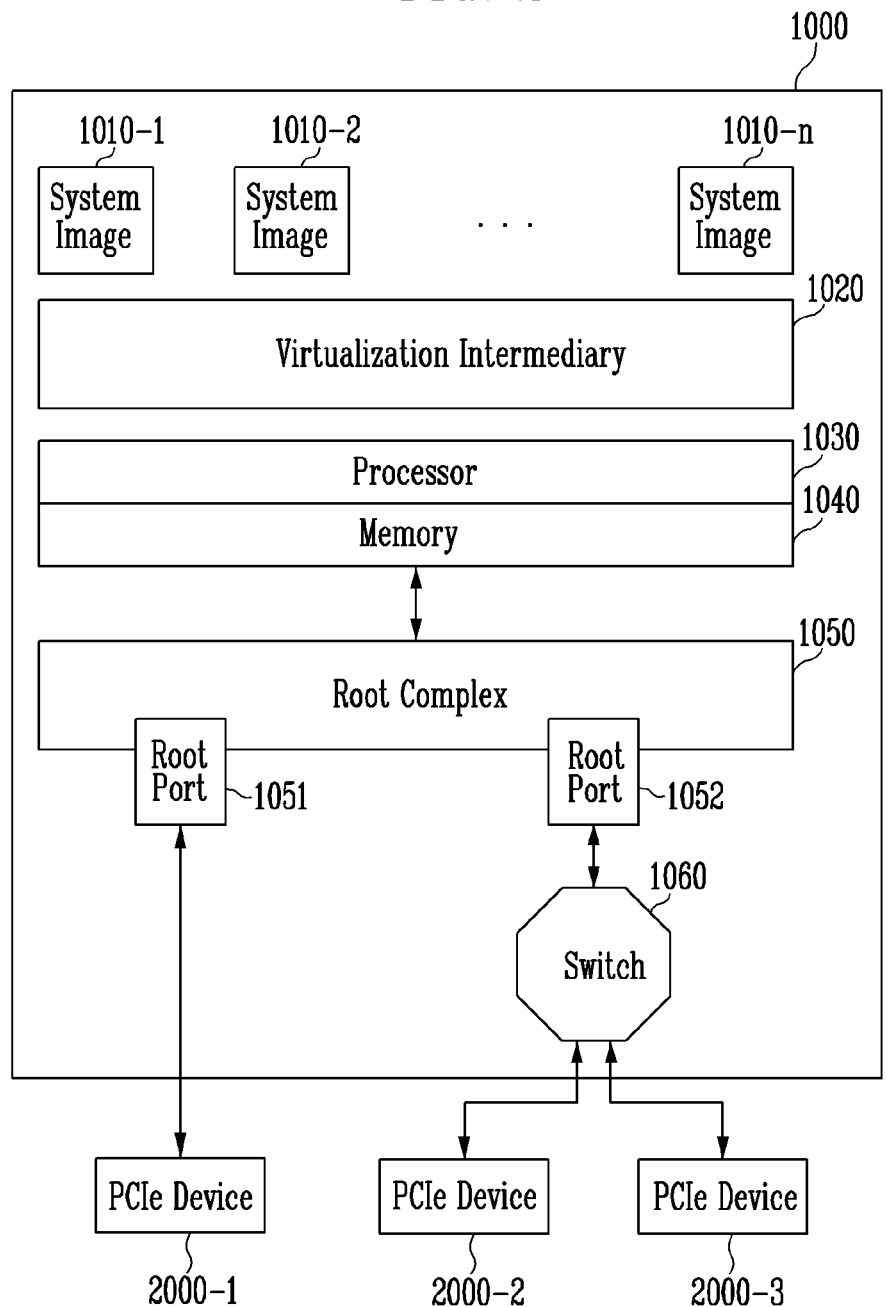
FIG. 2 illustrates a host of FIG. 1.

FIG. 2 illustrates the host of FIG. 1.

In an embodiment, FIG. 2 illustrates the host 1000 in which PCIe is available.

Referring to FIG. 2, the host 1000 may include a plurality of system images 1010-1 to 1010-*n*, a virtualization intermediary 1020, a processor 1030, a memory 1040, a root complex 1050, and a switch 1060, n being a positive integer.

In an embodiment, each of a plurality of PCIe devices 2000-1 to 2000-3 may correspond to the PCIe device 2000 of FIG. 1.

The system images 1010-1 to 1010-*n* may be software components executed on a virtual system to which PCIe functions may be allocated. In an embodiment, the system images 1010-1 to 1010-*n* may be referred to as virtual machines. The system images 1010-1 to 1010-*n* may be software such as an operating system used to execute applications or trusted services. For example, the system images 1010-1 to 1010-*n* may be composed of a guest operating system (Guest OS), a shared or non-shared I/O device driver, etc. In order to improve the efficiency of hardware resource utilization without modifying hardware, the plurality of system images 1010-1 to 1010-n may be executed on the computing system 100.

In an embodiment, a PCIe function may be an independent operation unit which provides physical resources included in the PCIe devices 2000-1 to 2000-3. In the present specification, the term "PCIe function" and the term "function" may be used to have the same meaning.

The virtualization intermediary 1020 may be a software component that supports the plurality of system images 1010-1 to 1010-n. In an embodiment, the virtualization intermediary 1020 may be referred to as a hypervisor or a virtual machine monitor (VMM). The virtualization intermediary 1020 may be interposed between hardware, such as the processor 1030 and the memory 1040, and the system images 1010-1 to 1010-n. Input/output (I/O) operations (inbound or outbound I/O operations) in the computing system 100 may be intercepted and processed by the virtualization intermediary 1020. The virtualization intermediary 1020 may present respective system images 1010-1 to 1010-n having their own virtual systems by abstracting hardware resources. Actual hardware resources usable in the respective system images 1010-1 to 1010-n may vary with a workload or customer-specific policies.

The processor 1030 may include circuits, interfaces, or program codes, which perform data processing and control operations of the components of the computing system 100. For example, the processor 1030 may include a central processing unit (CPU), an Advanced RISC Machine (ARM), an application specific integrated circuit (ASIC), or the like.

The memory 1040 may include a volatile memory such as an SRAM, a DRAM, or the like, which stores data, commands, and/or program codes required for the operations of the computing system 100. Also, the memory 1040 may include a nonvolatile memory. In an embodiment, the memory 1040 may also store program codes that are operable to execute one or more operating systems (OS) and virtual machines (VM), and program codes that run the virtualization intermediary (VI) 1020 for managing the virtual machines.

The processor 1030 may run one or more operating systems and virtual machines by executing the program codes stored in the memory 1040. Further, the processor 1030 may run the virtualization intermediary 1020 for managing the virtual machines. In this manner, the processor 1030 may control the operations of the components of the computing system 100.

The root complex 1050 indicates a root of an I/O hierarchy structure which couples the processor 1030/memory 1040 to I/O ports.

The computing system 100 may include one or more root complexes. Further, each root complex 1050 may include one or more root ports, e.g., 1051 and 1052. The root ports 1051 and 1052 denote separate hierarchies. The root complex 1050 may communicate with the switch 1060 or the PCIe devices 2000-1 to 2000-3 through the root ports 1051 and 1052.

A function of routing a peer-to-peer transaction between hierarchy domains through the root complex 1050 is optional. Each hierarchy domain may be implemented as a sub-hierarchy including either a single endpoint or one or more switches and an endpoint.

The root complex 1050 may split a packet into smaller packets when routing the peer-to-peer transaction between the hierarchy domains. For example, the root complex 1050 may split a single packet having a 256-byte payload into two packets, each having a 128-byte payload. An exception to this is that the root complex 1050, which supports peer-to-peer routing of Vendor_Defined Messages (VDMs), is not allowed to split each vendor-defined message packet into smaller packets except at 128-byte boundaries (i.e., all result packets except a last packet should have a payload size of integer multiples of 128 bytes).

The root complex 1050 should support the generation of a configuration request as a requester. The root complex 1050 may support the generation of an I/O request as a requester.

The root complex 1050 should not support lock semantics as a completer. The root complex 1050 may support the generation of a locked request as a requester.

The switch 1060 may be defined as a logical assembly of various virtual PCI-PCI bridge devices. The switch 1060 may communicate with the PCIe devices 2000-2 and 2000-3 coupled thereto.

The switch 1060 is indicated by two or more logical PCI-PCI bridges in configuration software.

The switch 1060 may transfer transactions using a PCI bridge mechanism. The switch 1060 may transfer all types of Transaction Layer Packets (TLP) between all port sets. The switch 1060 may support a locked request.

The switch 1060 cannot split a packet into smaller packets.

Arbitration between ingress ports of the switch 1060 may be implemented in a round robin or weighted round robin manner when contention occurs in the same virtual channel.

The endpoint should not be represented in configuration software in an internal bus of the switch 1060, as a peer in a virtual PCI-PCI bridge indicating a switch downstream port.

Figure 3:
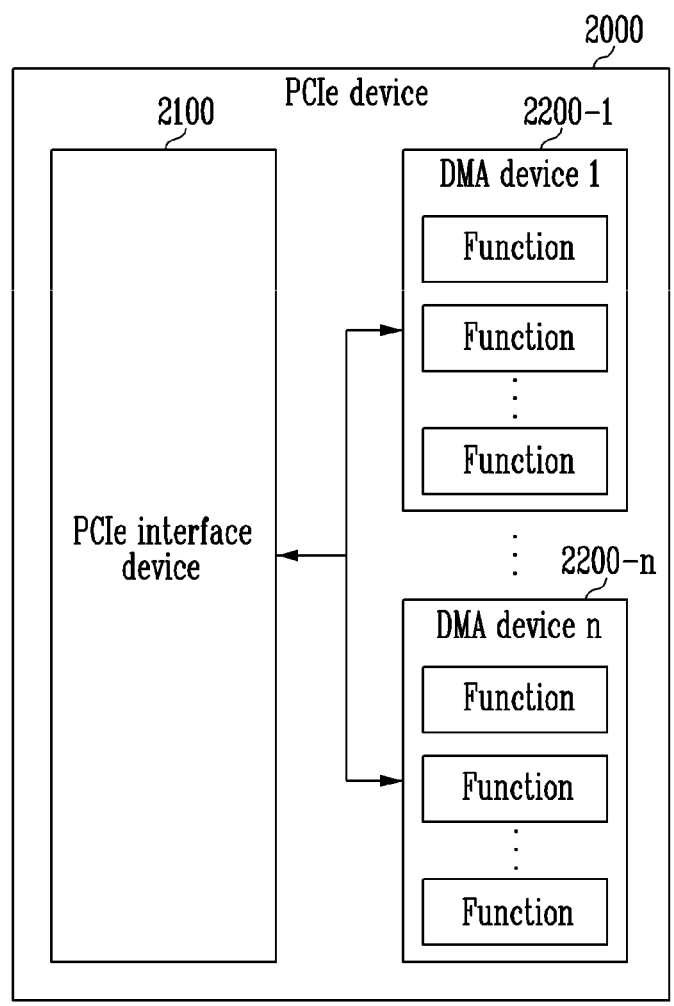
FIG. 3 illustrates a PCIe device of FIG. 1.

FIG. 3 illustrates the PCIe device of FIG. 1.

Referring to FIG. 3, the PCIe device 2000 may include a PCIe interface device 2100 and a plurality of Direct Memory Access (DMA) devices 2200-1 to 2200-n.

The PCIe interface device 2100 may receive transaction layer packets from a plurality of functions that are executed in the plurality of DMA devices 2200-1 to 2200-n. The PCIe interface device 2100 may deliver the transaction layer packets received from the respective functions to the host 1000 of FIG. 1.

The types of the DMA devices 2200-1 to 2200-n may include a NonVolatile Memory Express (NVMe) device, a Solid State Drive (SSD) device, an Artificial Intelligence Central Processing Unit (AI CPU), an Artificial Intelligence System on Chip (AI SoC), an Ethernet device, a sound card, a graphics card, etc. The types of the DMA devices 2200-1 to 2200-n are not limited thereto, and may include other types of electronic devices employing a PCIe interface. Functions may be executed on the DMA devices 2200-1 to 2200-n, and may be software or firmware which processes transactions of transaction layer packets.

Functions may be executed on each of the DMA devices 2200-1 to 2200-n. For example, each of the DMA devices 2200-1 to 2200-n may include one or more functions executed thereon. Here, the number of functions executed on each of the DMA devices 2200-1 to 2200-n may vary according to embodiments. The PCIe device 2000 may generate a physical function or a virtual function in response to a virtualization request received from the host 1000. The PCIe device 2000 may allocate the functions to the respective DMA devices 2200-1 to 2200-n. The number of functions allocated to and executed on each of the DMA devices 2200-1 to 2200-n may be individually set. Therefore, one or more functions may be allocated to one DMA device (e.g., one of 2200-1 to 2200-n), and each function may be executed as an independent operation unit.

Figure 4:
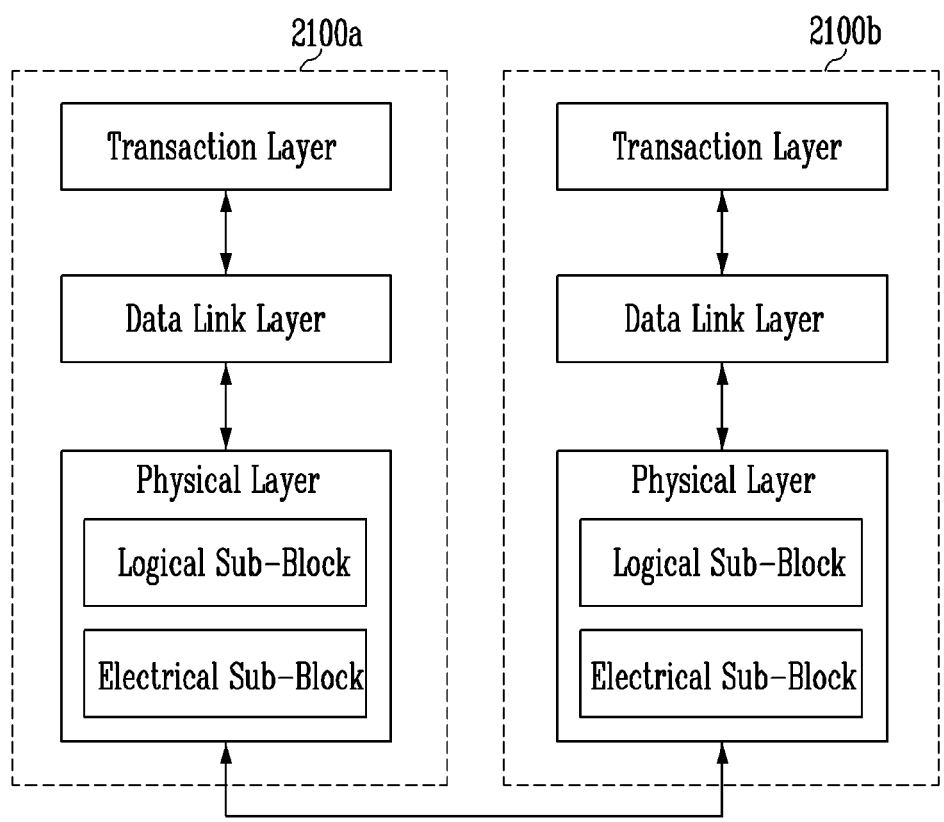
FIG. 4 illustrates a structure of layers included in a PCIe interface device of FIG. 3.

FIG. 4 illustrates a structure of layers included in a PCIe interface device.

Referring to FIG. 4, a first PCIe interface device 2100*a* and a second PCIe interface device 2100*b* are illustrated. Each of the first PCIe interface device 2100*a* and the second PCIe interface device 2100*b* may correspond to the PCIe interface device 2100 of FIG. 3.

PCIe layers included in each of the first and second PCIe interface devices 2100*a* and 2100*b* may include three discrete logical layers. For example, the PCIe layers may include a transaction layer, a data link layer, and a physical layer. Each of the layers may include two sections. One of the two sections may process outbound information (or information to be transmitted), and the other one may process inbound information (or received information). Further, the first and second PCIe interface devices 2100*a* and 2100*b* may use transaction layer packets so as to communicate information.

In each of the first and second PCIe interface devices 2100*a* and 2100*b*, the transaction layer may assemble and disassemble transaction layer packets. Also, the transaction layer may implement a split transaction that is a transaction for transferring other traffic to a link while a target system is collecting data required for a response. For example, the transaction layer may implement a transaction in which a request and a response are separated by time. In an embodiment, four transaction address spaces may include a configuration address space, a memory address space, an input/output address space, and a message address space. A memory space transaction may include one or more of a read request and a write request to transmit/receive data to/from a memory-mapped place. In an embodiment, the memory space transaction may use two different address formats, e.g., a short address format such as a 32-bit address and a long address format such as a 64-bit address. A configuration space transaction may be used to access a configuration space of a PCIe system. The transaction to the configuration space may include a read request and a write request. A message space transaction (or message) may be defined to support in-band communication between PCIe systems.

The transaction layer may store link configuration information or the like. Further, the transaction layer may generate a transaction layer packet (TLP), or may convert a TLP, received from an external device, into a payload or status information.

The data link layer may perform a link management function and a data integrity function including error detection and error correction. Specifically, a transmission side of the data link layer may accept a TLP assembled by the transaction layer, assign a data protection code to the TLP, and calculate a TLP sequence number of the TLP. Also, the transmission side of the data link layer may transmit the data protection code and the TLP sequence number to the physical layer so as to transmit the corresponding information through a link. A reception side of the data link layer may check the data integrity of a TLP received from the physical layer and transmit the TLP to the transaction layer so as to perform additional processing on the TLP.

The physical layer may include all circuitry for performing interface operations. Here, all circuitry may include a driver, an input buffer, a serial-to-parallel conversion circuit, a parallel-to-serial conversion circuit, a phase-locked loop (PLL), and an impedance matching circuit.

Further, the physical layer may include a logical sub-block and a electrical sub-block for physically transmitting a packet to an external PCIe system. Here, the logical sub-block may take a role that is necessary for a 'digital' function of the physical layer. With regard to this, the logical sub-block may include a transmission section for preparing outgoing information to be transmitted by the electrical sub-block and a reception section for identifying and preparing received information before delivering the received information to the data link layer.

The physical layer may include a transmitter and a receiver. The transmitter may receive symbols from the logical sub-block, serialize the symbols, and transmit the serialized symbols to an external device, e.g., the external PCIe system. Further, the receiver may receive serialized symbols from the external device, and convert the received symbols into a bitstream. The bitstream may be deserialized and supplied to the logical sub-block. That is, the physical layer may convert TLPs received from the data link layer into a serialized format, and may convert packets received from the external device into a deserialized format. Furthermore, the physical layer may include logical functions related to interface initialization and maintenance.

Although the structures of the first and second first PCIe interface devices 2100*a* and 2100*b* are illustrated in FIG. 4, the first and second first PCIe interface devices 2100*a* and 2100*b* may include an arbitrary form, such as a quick-path interconnect structure, a next-generation high-performance computing interconnect structure, or any other hierarchical structure.

Figure 5:
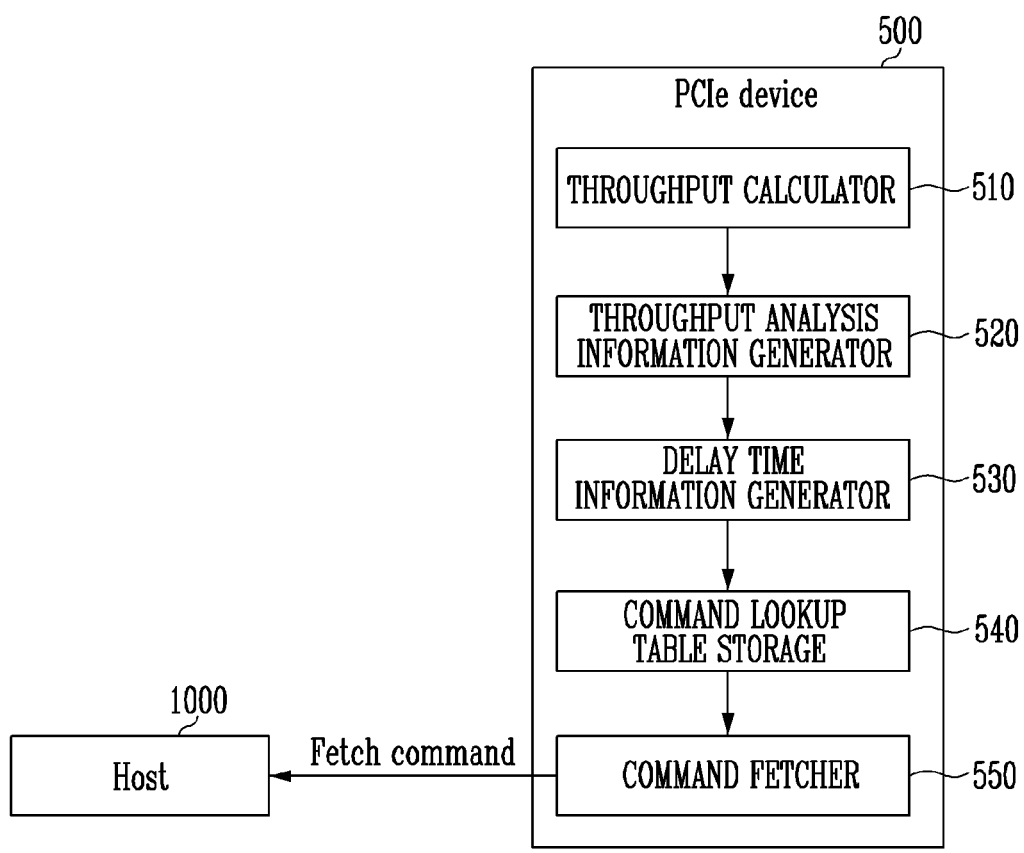
FIG. 5 illustrates a PCIe device according to an embodiment of the present disclosure.

FIG. 5 illustrates a PCIe device 500 according to an embodiment of the present disclosure.

The PCIe device 500 may correspond to any of the PCIe devices 2000, 2000-1, 2000-2, and 2000-3 illustrated in FIGS. 1 to 3.

Referring to FIG. 5, the PCIe device 500 may include a throughput calculator 510, a throughput analysis information generator 520, a delay time information generator 530, a command lookup table storage 540, and a command fetcher 550.

The throughput calculator 510 may calculate a throughput of each of a plurality of functions executed on a plurality of DMA devices. The throughput may be an index indicating the performance of each of the functions. The throughput calculator 510 may periodically calculate the throughput of each of the functions.

In an embodiment, the throughput calculator 510 may calculate the throughput based on occupation rates of the plurality of functions for a data path shared between the plurality of functions. In an embodiment, the data path may be a path for coupling a PCIe interface device to the plurality of DMA devices.

For example, the throughput calculator 510 may calculate the occupation rate of each function of the plurality of functions based on the number of transaction layer packets of the function processed through the data path per unit time. Each of the plurality of functions may transmit a transaction layer packet, which includes identification information of the corresponding function, through the data path. Accordingly, the throughput calculator 510 may calculate the occupation rate of each of the plurality of functions based on the function identification information included in the transaction layer packets. The throughput calculator 510 may calculate the throughputs of the plurality of functions based on the calculated occupation rates of the plurality of functions. The throughput calculator 510 may provide the calculated throughputs to the throughput analysis information generator 520.

In an embodiment, the throughput calculator 510 may calculate a read throughput corresponding to a read operation and a write throughput corresponding to a write operation for each of the plurality of functions. Here, the read throughput corresponding to the read operation may be a throughput calculated during the read operation of the corresponding function, and the write throughput corresponding to the write operation may be a throughput calculated during the write operation of the corresponding function. Therefore, the throughput of each of the plurality of functions may include the read throughput corresponding to the read operation and the write throughput corresponding to the write operation.

The throughput analysis information generator 520 may generate throughput analysis information for each of the plurality of functions based on a throughput limit that is set for each of the plurality of functions and the calculated throughput for each of the plurality of functions. For example, the throughput analysis information generator 520 may periodically generate throughput analysis information based on the throughputs provided from the throughput calculator 510.

Here, the throughput limit may be a threshold value set to limit a throughput of each function. For example, the throughput analysis information generator 520 may receive information about the throughput limit of each of the plurality of functions from the host 1000. The throughput analysis information generator 520 may set the throughput limit of each of the plurality of functions depending on the received information about the throughput limit.

Here, the throughput analysis information may be information indicating a result of a comparison between the throughput limit and the calculated throughput. In an embodiment, the throughput analysis information may include at least one of information indicating whether the calculated throughput exceeds the throughput limit, an excess ratio of the calculated throughput to the throughput limit, a residual ratio of the calculated throughput to the throughput limit, information about whether each function is in an idle state, and information about whether the calculated throughput is lower than a minimum performance threshold value set for each function. The throughput analysis information may further include any of various types of information that can be acquired by comparatively analyzing throughputs.

In an embodiment, the excess ratio of the calculated throughput to the throughput limit may be calculated when a throughput calculated for a specific function exceeds a throughput limit set for the specific function. For example, the excess ratio of the calculated throughput to the throughput limit may be represented by the following Equation (1).

$$\text{Excess ratio} = (\text{calculated throughput} - \text{throughput limit})/\text{throughput limit} \quad (1)$$

In an embodiment, the residual ratio of the calculated throughput to the throughput limit may be calculated when the throughput calculated for the specific function does not exceed the throughput limit set for the specific function. For example, the residual ratio of the calculated throughput to the throughput limit may be represented by the following Equation (2).

$$\text{Residual ratio} = (\text{throughput limit} - \text{calculated throughput})/\text{throughput limit} \quad (2)$$

In an embodiment, the throughput analysis information generator 520 may generate read throughput analysis information corresponding to a read operation and write throughput analysis information corresponding to a write operation. For example, the throughput analysis information generator 520 may generate the read throughput analysis information corresponding to the read operation based on a result of a comparison between the throughput and the throughput limit which correspond to the read operation. Further, the throughput analysis information generator 520 may generate the write throughput analysis information corresponding to the write operation based on a result of a comparison between the throughput and the throughput limit which correspond to the write operation. Therefore, the throughput analysis information may include the read throughput analysis information corresponding to the read operation and the write throughput analysis information corresponding to the write operation.

In an embodiment, the minimum performance threshold value may be a threshold value that prevents a latency from occurring during an operation of the specific function. The throughput analysis information generator 520 may set a minimum performance threshold value for each of the plurality of functions.

The throughput analysis information generator 520 may provide the throughput analysis information to the delay time information generator 530.

The delay time information generator 530 may generate a delay time of each of the plurality of functions based on the throughput analysis information. Here, the delay time may be information for delaying a command fetch operation corresponding to each function.

In an embodiment, when the delay time information generator 530 generates a delay time of a function, for which the calculated throughput exceeds the throughput limit, among the plurality of functions, the delay time information generator 530 may increase the delay time of the function based on the excess ratio of the calculated throughput to the throughput limit. For example, the delay time information generator 530 may calculate a delay time increment value by multiplying a first constant value by the excess ratio. Here, the first constant value may be variously set depending on settings by the host 1000. The delay time information generator 530 may calculate a value increased from a previous delay time of the function, which has been previously generated, by the delay time increment value, as a current delay time corresponding to the function.

In an embodiment, when the delay time information generator 530 generates a delay time of a function, for which the calculated throughput does not exceed the throughput limit, among functions having delay times that are greater than an initial value, the delay time information generator 530 may decrease the delay time of the function based on the residual ratio of the calculated throughput to the throughput limit. In an embodiment, the initial value of the delay time may be '0.' For example, the delay time information generator 530 may calculate a delay time decrement value by multiplying a second constant value by the residual ratio. Here, the second constant value may be variously set depending on the settings by the host 1000. The delay time information generator 530 may calculate a value decreased from a previous delay time of the function, which has been previously generated, by the delay time decrement value, as a current delay time of the function.

In an embodiment, the delay time information generator 530 may set a delay time of a function, which is in an idle state, and a delay time of a function, for which the calculated throughput is lower than the minimum performance threshold value, among the plurality of functions, to the initial value. Accordingly, the delay times of those functions may be set to '0.'

In an embodiment, a delay time may include a read delay time corresponding to a read operation and a write delay time corresponding to a write operation. For example, the delay time information generator 530 may generate the read delay time corresponding to the read operation based on the read throughput analysis information corresponding to the read operation. Further, the delay time information generator 530 may generate the write delay time corresponding to the write operation based on the write throughput analysis information corresponding to the write operation.

The delay time information generator 530 may provide the delay time to the command lookup table storage 540.

The command lookup table storage 540 may include a command lookup table. Here, the command lookup table may store command-related information including information related to a target command to be fetched from the host 1000 and a delay time of a function corresponding to the target command, among the plurality of functions. The command lookup table may store command-related information for each of a plurality of target commands. In an embodiment, the command-related information may include an address at which each target command is stored in the host 1000, information indicating whether the corresponding target command is a read command or a write command, identification information of a function assigned to the corresponding target command, etc.

The command lookup table storage 540 may receive the command-related information for the target command from the host 1000. For example, the host 1000 may update a submission queue head doorbell so as to request the PCIe device 500 to execute the target command. Here, the command lookup table storage 540 may receive the command-related information for the target command, which is requested to be executed, from the host 1000.

In an embodiment, the command lookup table storage 540 may store delay time lapse information by associating the delay time lapse information with the command-related information. Here, the delay time lapse information may be information indicating whether the delay time of the function corresponding to the target command has elapsed from a time point at which the command-related information for the target command is stored in the command lookup table. For example, when the target command is a read command, the delay time lapse information may be generated based on the read delay time corresponding to the read operation. When the target command is a write command, the delay time lapse information may be generated based on the write delay time corresponding to the write operation.

In an embodiment, the command lookup table storage 540 may count a time from a time point at which the command-related information is stored in the command lookup table, and may then check whether the delay time has elapsed. For example, when the delay time of the function has elapsed, the delay time lapse information may include information indicating that the delay time of the function has expired. On the other hand, when the delay time of the function has not elapsed, the delay time lapse information may include information indicating that the delay time of the function has not yet expired.

The command fetcher 550 may fetch a target command from the host 1000 based on command-related information for the target command and a delay time of a function corresponding to the target command.

In an embodiment, the command fetcher 550 may determine whether to fetch the target command based on the delay time lapse information. For example, when it is determined that the delay time of the corresponding function has elapsed from the time point at which the command-related information is stored in the command lookup table based on the delay time lapse information, the command fetcher 550 may send a fetch command to the host 1000 to fetch the target command from the host 1000. On the other hand, when it is determined that the delay time of the corresponding function has not elapsed from the time point at which the command-related information is stored in the command lookup table based on the delay time lapse information, the command fetcher 550 may delay a command fetch operation for the target command. In this case, the command fetcher 550 may skip the command fetch operation for the target command, and may perform a command fetch operation for another target command for which a delay time has elapsed.

In accordance with an embodiment of the present disclosure, a command fetch operation for a target command may be controlled based on delay times assigned to respective functions, and thus limitation in performance for each function may be promptly and accurately performed.

In accordance with an embodiment of the present disclosure, the components of the PCIe device 500 may be implemented with one or more processors and a memory or register.

Figure 6:
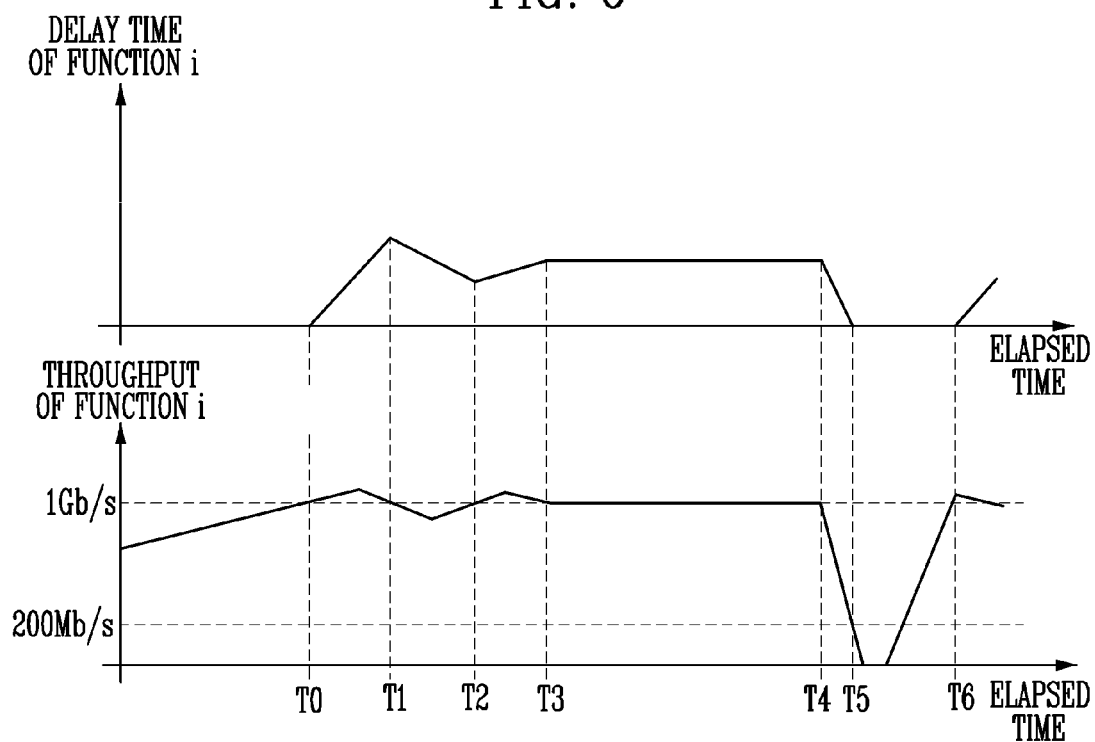
FIG. 6 is a graph for explaining an operation of generating delay time information according to an embodiment of the present disclosure.

FIG. 6 is a graph for explaining an operation of generating delay time information according to an embodiment of the present disclosure.

An upper portion of FIG. 6 may indicate a change in a delay time of a function i depending on an elapsed time. The delay time of the function i may be generated by the delay time information generator 530 of FIG. 5. A lower portion of FIG. 6 may indicate a change in a throughput of the function i depending on the elapsed time. The throughput of the function i may be generated by the throughput calculator 510 of FIG. 5.

The function i described in FIG. 6 may indicate one of the plurality of functions illustrated in FIG. 3. In FIG. 6, it is assumed that a throughput limit of the function i is set to 1 Gb/s and a minimum performance threshold value of the function i is set to 200 Mb/s. It is assumed that an initial value of the delay time of the function i is '0.'

Before time T0, the throughput of the function i is lower than the throughput limit, and thus the delay time of the function i may still be the initial value.

During a period from the time T0 to time T1, the throughput of the function i exceeds the throughput limit, and thus the delay time information generator 530 may calculate a delay time increment value based on an excess ratio of the calculated throughput to the throughput limit of the function i. Accordingly, the delay time of the function i may be increased by the delay time increment value.

During a period from the time T1 to time T2, the throughput of the function i does not exceed the throughput limit, but is higher than the minimum performance threshold value, and thus the delay time information generator 530 may calculate a delay time decrement value based on a residual ratio of the calculated throughput to the throughput limit of the function i. Accordingly, the delay time of the function i may be decreased by the delay time decrement value.

During a period from the time T2 to time T3, the throughput of the function i exceeds the throughput limit, and thus the delay time information generator 530 may calculate a delay time increment value based on the excess ratio of the calculated throughput to the throughput limit of the function i. Accordingly, the delay time of function i may be increased again by the delay time increment value.

During a period from the time T3 to time T4, it is assumed that an increase and a decrease in the delay time of the function i are repeated, and thus the delay time of the function i is maintained at a constant value. In this way, in accordance with an embodiment of the present disclosure, a command fetch operation may be controlled based on delay times of respective functions, and thus limitation in performance for each function may be promptly and accurately performed.

During a period from the time T4 to time T5, the throughput of the function i does not exceed the throughput limit and is higher than the minimum performance threshold value, and thus the delay time information generator 530 may calculate a delay time decrement value based on the residual ratio of the calculated throughput to the throughput limit of the function i. Accordingly, the delay time of the function i may be decreased again by the delay time decrement value.

At the time T5, the throughput of the function i is lower than the minimum performance threshold value, and thus the delay time information generator 530 may set the delay time of the function i to the initial value. Accordingly, the delay time of the function i may be '0.'

During a period from the time T5 to time T6, when the throughput of the function i is lower than the throughput limit and thus the delay time of the function i has the initial value, the delay time of the function i may be maintained at the initial value. That is, when the delay time is the initial value, the delay time does not increase until the throughput of the function i exceeds the throughput limit.

At the time T6, the throughput of the function i exceeds the throughput limit, and thus the delay time information generator 530 may calculate a delay time increment value based on the excess ratio of the calculated throughput to the throughput limit of the function i. Accordingly, the delay time of the function i may be increased again by the delay time increment value.

Figure 7:
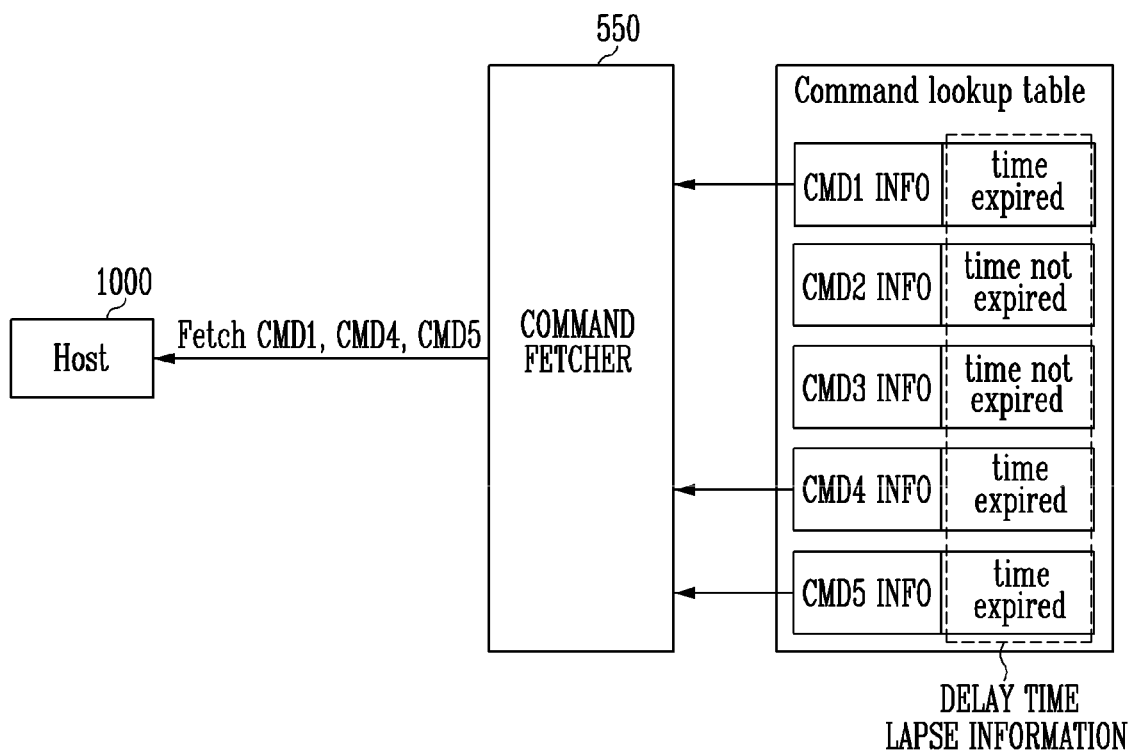
FIG. 7 illustrates a command fetch operation according to an embodiment of the present disclosure.

FIG. 7 illustrates a command fetch operation according to an embodiment of the present disclosure.

Referring to FIG. 7, a command lookup table may store command-related information for a plurality of target commands and delay time lapse information associated with the command-related information. In FIG. 7, it is assumed that command-related information CMD1 INFO to CMD5 INFO respectively for five target commands CMD1 to CMD5 are stored in the command lookup table.

The command fetcher 550 of FIG. 5 may determine, based on the command lookup table, whether a command fetch operation for target commands is to be performed. The command fetcher 550 may check the command-related information and the delay time lapse information, which are stored in the command lookup table, at a time point at which the command fetch operation is performed. Based on the result of checking, the command fetcher 550 may perform the command fetch operation for the target commands when delay times corresponding to the target commands have expired, and may skip the command fetch operation for the target commands when the delay times have not expired.

For example, referring to FIG. 7, the delay time lapse information stored in association with the command-related information CMD1 INFO, CMD4 INFO, and CMD5 INFO may include information indicating that the corresponding delay times have expired. In this case, the command fetcher 550 may send a fetch command to the host 1000 to fetch the first target command CMD1, the fourth target command CMD4, and the fifth target command CMD5 from the host 1000.

Unlike these target commands, the delay time lapse information stored in association with the command-related information CMD2 INFO and CMD3 INFO may include information indicating that the corresponding delay times have not expired. In this case, the command fetcher 550 may skip a command fetch operation for the second target command CMD2 and the third target command CMD3.

Figure 8:
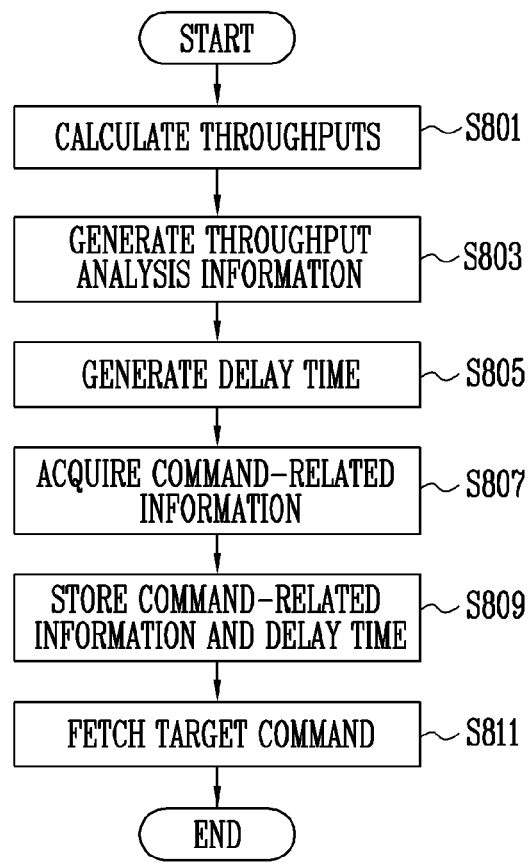
FIG. 8 is a flowchart illustrating a method of operating a PCIe device according to an embodiment of the present disclosure.

FIG. 8 is a flowchart illustrating a method of operating a PCIe device according to an embodiment of the present disclosure.

The method illustrated in FIG. 8 may be performed by, for example, the PCIe device 500 illustrated in FIG. 5.

Referring to FIG. 8, at S801, the PCIe device 500, e.g., the throughput calculator 510, may calculate throughputs of a plurality of functions.

Here, the PCIe device 500, e.g., the throughput calculator 510, may calculate an occupation rate of each function of the plurality of functions for a data path shared between the plurality of functions based on the number of transaction layer packets of the function processed through the data path per unit time. The PCIe device 500, e.g., the throughput calculator 510, may calculate the throughputs based on the occupation rates.

At S803, the PCIe device 500, e.g., the throughput analysis information generator 520, may generate throughput analysis information for each of the plurality of functions based on a throughput limit set for each of the functions and a throughput calculated for each of the functions.

At S805, the PCIe device 500, e.g., the delay time information generator 530, may generate a delay time of each of the plurality of functions based on the throughput analysis information.

Here, the PCIe device 500, e.g., the delay time information generator 530, may increase a delay time of a function, for which the calculated throughput exceeds the throughput limit, among the plurality of functions, based on an excess ratio of the calculated throughput to the throughput limit.

Further, the PCIe device 500, e.g., the delay time information generator 530, may decrease a delay time of a function, for which the calculated throughput does not exceed the throughput limit, among functions having delay times that are higher than an initial value, based on a residual ratio of the calculated throughput to the throughput limit.

Furthermore, the PCIe device 500, e.g., the delay time information generator 530, may set a delay time of a function, which is in an idle state, and a delay time of a function, for which the calculated throughput is lower than a minimum performance threshold value, among the plurality of functions, to the initial value.

At S807, the PCIe device 500, e.g., the command lookup table storage 540, may acquire command-related information including information related to a target command to be fetched from a host.

At S809, the PCIe device 500, e.g., the command lookup table storage 540, may store the command-related information and a delay time of a function corresponding to the target command.

At S811, the PCIe device 500, e.g., the command fetcher 550, may fetch the target command from the host based on the command-related information and the delay time of the function corresponding to the target command.

FIG. 9 is a flowchart illustrating a method of fetching a target command according to an embodiment of the present disclosure.

The method illustrated in FIG. 9 may be obtained by realizing S809 and S811 illustrated in FIG. 8.

The method illustrated in FIG. 9 may be performed by, for example, the PCIe device 500 illustrated in FIG. 5.

Referring to FIG. 9, at S901, the PCIe device 500, e.g., the command lookup table storage 540, may store command-related information.

At S903, the PCIe device 500, e.g., the command lookup table storage 540, may store delay time lapse information in association with the command-related information.

At S905, the PCIe device 500, e.g., the command lookup table storage 540, may determine, based on the delay time lapse information, whether the delay time of the function corresponding to the target command has elapsed or expired. When it is determined at S905 that the delay time has elapsed, the PCIe device 500, e.g., the command fetcher 550, may perform S907.

At S907, the PCIe device 500, e.g., the command fetcher 550, may fetch the target command from the host.

In contrast, when it is determined at S905 that the delay time has not elapsed, the PCIe device 500, e.g., the command fetcher 550, may perform S909.

At S909, the PCIe device 500, e.g., the command fetcher 550, may delay a command fetch operation for the target command.

In accordance with the present disclosure, there are provided a PCIe device that is capable of limiting performance for each function and a method of operating the PCIe device.

What is claimed is:

1. A Peripheral Component Interconnect Express (PCIe) device, comprising:
    a throughput calculator configured to calculate a throughput of each of a plurality of functions, the plurality of functions being operation units that process transactions of transaction layer packets and are executed on a plurality of direct memory access (DMA) devices, the throughput being an indicator of performance of each of the plurality of functions;
    a throughput analysis information generator configured to generate, for each of the plurality of functions, throughput analysis information indicating a result of a comparison between a throughput limit that is set for each of the plurality of functions and the calculated throughput output from the throughput calculator;
    a delay time information generator configured to generate a delay time for delaying a command fetch operation for each of the plurality of functions based on the throughput analysis information;
    a command lookup table storage configured to store command-related information and a delay time of a function corresponding to a target command, the command-related information including information related to the target command to be fetched from a host; and
    a command fetcher configured to fetch the target command from the host based on the command-related information and the delay time of the corresponding function.

2. The PCIe device according to claim 1, wherein the throughput calculator calculates the throughput of each function of the plurality of functions based on an occupation rate of the function for a data path shared between the plurality of functions.

3. The PCIe device according to claim 2, wherein the throughput calculator calculates the occupation rate of each function of the plurality of functions based on a number of transaction layer packets of the function processed through the data path per unit time.

4. The PCIe device according to claim 1, wherein the throughput analysis information generator receives information about the throughput limit of each of the plurality of functions from the host, and sets the throughput limit of each of the plurality of functions based on the received information about the throughput limit.

5. The PCIe device according to claim 1, wherein, for each of the plurality of functions, the throughput analysis information includes at least one of information indicating whether the calculated throughput exceeds the throughput limit, an excess ratio of the calculated throughput to the throughput limit, a residual ratio of the calculated throughput to the throughput limit, information about whether each of the plurality of functions is in an idle state, and information about whether the calculated throughput is lower than a minimum performance threshold value set for each of the plurality of functions.

6. The PCIe device according to claim 5, wherein the delay time information generator is configured to increase a delay time of a given function based on the excess ratio when the calculated throughput exceeds the throughput limit, the given function being one of the plurality of functions.

7. The PCIe device according to claim 5, wherein the delay time information generator is configured to decrease a delay time of a given function based on the residual ratio when the calculated throughput does not exceed the throughput limit, the given function being one of functions having delay times that are higher than an initial value, among the plurality of functions.

8. The PCIe device according to claim 5, wherein the delay time information generator sets a delay time of a function that is in an idle state and a delay time of a function, for which the calculated throughput is lower than the minimum performance threshold value, among the plurality of functions, to an initial value.

9. The PCIe device according to claim 1, wherein the command lookup table storage stores delay time lapse information indicating whether the delay time of the corresponding function has elapsed from a time point at which the command-related information is stored in the command lookup table storage, the delay time lapse information being stored in association with the command-related information.

10. The PCIe device according to claim 9, wherein the command fetcher fetches the target command from the host when the delay time of the corresponding function has elapsed from the time point at which the command-related information is stored based on the delay time lapse information.

11. The PCIe device according to claim 9, wherein the command fetcher delays a command fetch operation for the target command when the delay time of the corresponding function has not elapsed from the time point at which the command-related information is stored based on the delay time lapse information.

12. The PCIe device according to claim 1, wherein:
    the calculated throughput includes a read throughput corresponding to a read operation and a write throughput corresponding to a write operation of each of the plurality of functions,
    the throughput analysis information includes read throughput analysis information corresponding to the read operation and write throughput analysis information corresponding to the write operation, and
    the delay time includes a read delay time corresponding to the read operation and a write delay time corresponding to the write operation.

13. A method of operating a Peripheral Component Interconnect Express (PCIe) device, the method comprising:

calculating a throughput of each of a plurality of functions, the plurality of functions being operation units that process transactions of transaction layer packets and are executed on a plurality of direct memory access (DMA) devices, the throughput being an indicator of performance of each of the plurality of functions;

generating, for each of the plurality of functions, throughput analysis information indicating a result of a comparison between a throughput limit that is set for each of the plurality of functions and the calculated throughput;

generating a delay time for delaying a command fetch operation for each of the plurality of functions based on the throughput analysis information;

acquiring command-related information including information related to a target command to be fetched from a host; and fetching the target command from the host based on the command-related information and a delay time of a function corresponding to the target command, among the plurality of functions.

14. The method according to claim 13, where calculating the throughput comprises:

calculating an occupation rate of each function of the plurality of functions for a data path shared between the plurality of functions based on a number of transaction layer packets of the function processed through the data path per unit time; and calculating the throughput based on the occupation rates.

15. The method according to claim 13, wherein, for each of the plurality of functions, the throughput analysis information includes at least one of information indicating whether the calculated throughput exceeds the throughput limit, an excess ratio of the calculated throughput to the throughput limit, a residual ratio of the calculated throughput to the throughput limit, information about whether each of the plurality of functions is in an idle state, and information about whether the calculated throughput is lower than a minimum performance threshold value set for each of the plurality of functions.

16. The method according to claim 15, wherein generating the delay time comprises:

increasing a delay time of a given function based on the excess ratio when the calculated throughput exceeds the throughput limit, the given function being one of the plurality of functions.

17. The method according to claim 15, wherein generating the delay time comprises:

decreasing a delay time of a given function based on the residual ratio when the calculated throughput does not exceed the throughput limit, the given function being one of functions having delay times that are higher than an initial value.

18. The method according to claim 15, wherein generating the delay time comprises:

setting a delay time of a function that is in an idle state and a delay time of a function, for which the calculated throughput is lower than the minimum performance threshold value, among the plurality of functions, to an initial value.

19. The method according to claim 13, further comprising:

storing the command-related information; and storing delay time lapse information indicating whether the delay time of the function corresponding to the target command has elapsed from a time point at which the command-related information is stored, the delay time lapse information being stored in association with the command-related information.

20. The method according to claim 19, wherein fetching the target command comprises:

fetching the target command from the host when the delay time of the function corresponding to the target command has elapsed from the time point at which the command-related information is stored, based on the delay time lapse information; and delaying a command fetch operation for the target command when the delay time of the function corresponding to the target command has not elapsed from the time point at which the command-related information is stored, based on the delay time lapse information.

* * * * *